United States Patent [19]

Mather

[11] Patent Number: 4,518,358
[45] Date of Patent: May 21, 1985

[54] EDUCATIONAL TOY AND METHOD

[76] Inventor: Naomi Mather, 62 Patton Dr., Princeton, N.J. 08540

[21] Appl. No.: 404,549

[22] Filed: Aug. 2, 1982

[51] Int. Cl.³ ................................................ G09B 1/04
[52] U.S. Cl. ..................................................... 434/195
[58] Field of Search ................................ 434/195, 196

[56] References Cited
U.S. PATENT DOCUMENTS 3,131,488 5/1964 Slater .................................... 434/195
3,229,388 1/1966 Smith .................................... 434/195

FOREIGN PATENT DOCUMENTS 919025 2/1963 United Kingdom ................ 434/195

Primary Examiner—William H. Grieb
Attorney, Agent, or Firm—Joel F. Spivak

[57] ABSTRACT

An educational toy and method is disclosed for teaching young children arithmetic using pattern recognition. The toy comprises unit size (square) indicia representing 'ones' and multiple size indicia (rectangles) representing a multiple of the one digit. The indicia are placed in an organizer which allows the unit indicia to enter in one direction and the multiple indicia to enter the organizer from the opposite direction so as to aid in creating the desired recognizable patterns representing different numbers.

12 Claims, 7 Drawing Figures

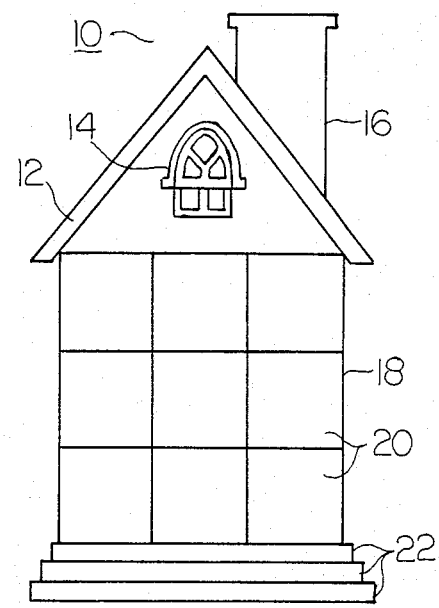
FIG. 1
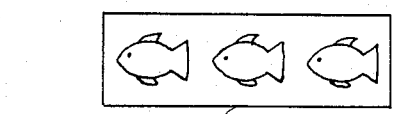
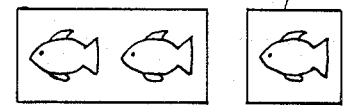
FIG. 2
FIG. 4
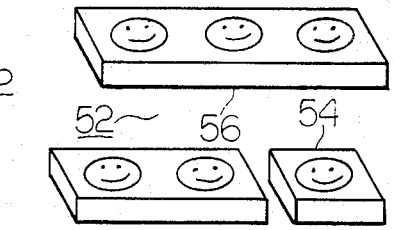
FIG. 3
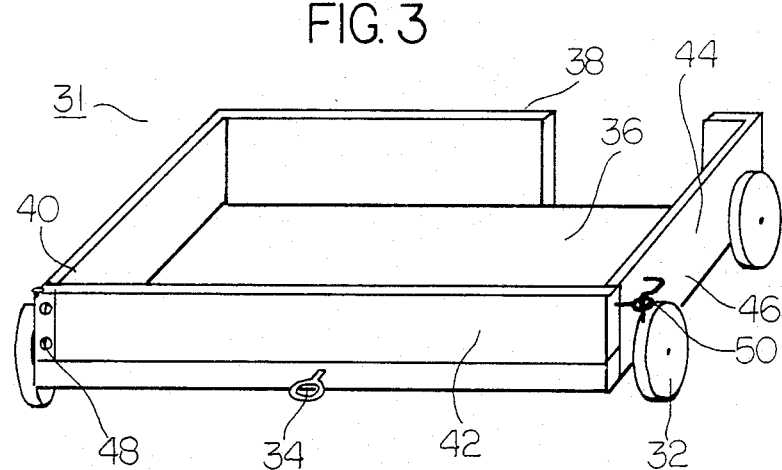

EDUCATIONAL TOY AND METHOD

FIELD OF THE INVENTION

This invention relates to an educational device and more particularly to an educational device useful for instructing very young children in arithmetic and to the teaching method associated with the device.

BACKGROUND OF THE INVENTION

A variety of educational devices have been employed to teach very young children the fundamentals of arithmetic. Such devices include the use of flash cards having different symbols, patterns, numbers or designs thereon representing one or more digits from 0 to 9; the use of blocks of varying length and number indiced thereon corresponding to the relative length of the block compared with a unit length, as well as other means and divices.

It has been shown in recent years that very young children e.g., ages 6 mos. or more often learn most easily by pattern recognition. While counting is often a very difficult task for many young children, and especially for those with short attention spans, most children can easily and quickly recognize a pattern. It would therefore, be desirable to employ a teaching device in which a child's interest can be sustained e.g., by colors, designs, movement, indicia or the like and which utilizes and aids in the formation of distinct patterns to represent the digits from 0 to 9.

SUMMARY OF THE INVENTION

The teaching devices of the present invention comprise a plurality of indicia of unit size and at least one indicia which is a multiple of unit size together with an organizer adapted to allow, either physically or by representation, for the placing of the indicia in the organizer so as to form a distinct set of patterns, each pattern representing a specific digit or number.

BRIEF DESCRIPTION OF THE DRAWINGS

FIG. 1 is a representation of a two dimensional organizer useful in the practice of the invention;

FIG. 2 is a representative of indicia for use with the organizer of FIG. 1;

FIG. 3 is an isometric view of a three dimensional organizer in the form of a square pull-toy;

FIG. 4 are blocks used as indicia with the organizer of FIG. 3; and

DETAILED DESCRIPTION

In general, the teaching devices comprise an organizer and a plurality of indicia of different sizes to be placed in the organizer to form a particular pattern which pattern corresponds to a specific number. While the organizers as represented by FIGS. 1 and 3 herein each contain nine squares coinciding with the numbers 0 to 9, the teaching device of the invention can be made so as to contain or represent more or less than nine numbers. For example, for simple pattern recognition, an organizer which contains or represents only four units, i.e. numbers 0-4 can be employed as well as a more complex organizer containing or representing sixteen units, i.e. numbers 0-16. For very young children an organizer which contains four or nine units is preferred with no more than three units in any row. The term organizer, as used herein, is meant to include any device or drawing capable of aiding in the formation of predetermined patterns by means of indicia to be placed therein in a preferred sequence, each pattern representing a specific number.

Figure 5:
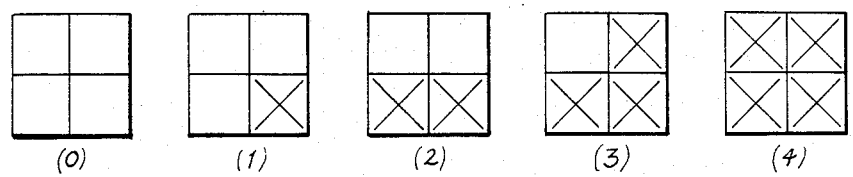
FIG. 5 shows the patterns representing the sequence of numbers from zero to four of an organizer which can accept only four indicia.
Figure 6:
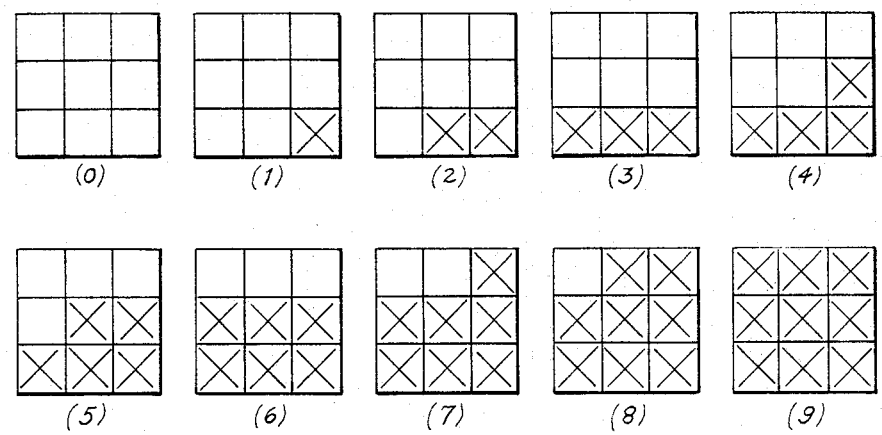
FIG. 6 shows the patterns representing the sequence of numbers from zero to nine of an organizer which can accept nine indicia.

In order to structure the formation of fixed patterns within the organizer, the organizer must either physically or by representation include means for accepting indicia representing a single unit i.e., the number 1 and separate means for accepting indicia representing a multiple of that unit e.g., a two or a three. The indicia are placed within the organizer in a fixed sequence so as to form a distinct pattern for each number. For example, where the organizer can accept only four indicia the patterns representing the sequence of numbers from 0 to 4 are as represented by FIG. 5 (0) to (4). Where the organizer can accept nine indicia a pattern sequence representing the numbers from 0 to 9 may be as represented by FIG. 6 (0) to (9).

Referring now to FIG. 1 there is shown a two dimensional organizer 10. While the organizer 10, as shown, is in the shape of a house, it should be understood that the invention is not limited to any particular shape and design. The house form is believed to be preferred as it is easily recognized by young children and easy to use as an organizer as will be explained hereinafter. The house has a roof 12 with an attic window design 14, a chimney 16 leading to the main portion 18 of the house which portion 18 is divided into a plurality of squares 20. A set of steps 22 is depicted as being in front of the house. In this instance, the house is shown as having nine squares in three rows and three columns. The chimney 16 is the width of a square 20 while the steps are at least the width of three squares. Associated with the organizer are a plurality of indicia 24 shown in FIG. 2. These indicia are of various sizes corresponding to a single square, 26 and rectangles corresponding in length to three squares 30.

Figure 7:
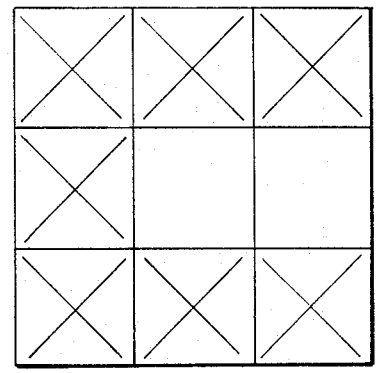
FIG. 7 depicts a non-recognizable pattern of the number 7, when filling the nine indicia organizer out of sequence.

In use, the child is taught that the rows are filled from bottom to top, the lowest or most bottom row being filled first and then the next row and finally the last row. Further, the rows are filled in a given direction or sequence e.g., left to right. In this way, specific patterns are formed, each pattern representing a number from 0 to 9. When all of the squares are filled in one organizer, the next one added can overflow to a second similar organizer representing the ten digits from 10 to 90 while the first organizer is emptied to start again. Another aspect of the organizer is that indicia representing a single unit is placed in the house through the chimney 16 which is the width of a single square 26 while indicia representing multiple units e.g., threes, can enter only through the steps. This facilitates the pattern formation during addition or subtraction of numbers by adding or removing indicia from the organizer, respectively in a prescribed manner. The chimney and steps are merely examples of special openings (or visual representations of openings) in a novel organizer to assist in the positioning of rectangles or squares in the formation of a recognizable pattern. Further, the child is preferably taught that additions and subtractions are made by first adding or subtracting individual squares to those already in the organizer followed by placing or removing the rectangles. Hence, if one was teaching the addition 3+4, the child can place a rectangle of three units in width in the bottom row of the organizer through the steps. Thereafter, a single square is placed down the chimney and in the right of the second row while a second three unit rectangle is placed in the bottom row through the steps displacing the previously positioned indicia one row to produce the pattern as shown in FIG. 6 (7), which pattern is recognized as a seven. Since the rectangles and squares enter from opposite sides and the rows are filled in sequence one cannot obtain a non-recognizable pattern such as represented by FIG. 7.

Another feature of the invention as shown in the drawing is to use indicia having a design or designs thereon, the number of designs representing the number of units represented by the indicia. These designs aid in pattern recognition and in maintaining a child's interest and attention as does the design of the organizer. The use of bright colors is also helpful for this purpose.

Generally, the indicia associated with any organizer are of two kind, a unit size indicia and a size equal to the number of units in a row. Therefore, in an organizer which is 2×2 units, the two indicia are one of unit size and one of twice unit size. Where the organizer is 3×3 the indicia are unit size and three times unit size. While in the latter instance one can also employ indicia twice unit size to be placed in the organizer through the wider opening, there is a chance that non-recognizable patterns can be formed.

FIG. 3 represents a second organizer 32. This organizer is in the form of a small wagon or pull toy having wheels 32 and pulling means 34. The wagon has a base 36 and side walls 38, 40, 42 and 44. Side walls 40 and 44 are fixed to the base 36 and extend the length of the base 36. Side wall 38 which is also fixed to the base, extends along about ⅔ of the base where a 3 unit by 3 unit organizer is employed or along about ½ the base where a two unit by two unit organizer is employed such that indicia representing only a single unit, i.e. the number 1 or the number 10, etc. can be placed in the organizer through the space left between the edge of the wall 38 and the next adjacent wall 44. Side wall 42 which is opposite wall 38 is hinged to adjacent wall 40 so that it can swing open or closed to allow rectangular indicia to be placed in the organizer. In order to secure the wall in a closed position when desired, such as when using the organizer as a simple pull toy, a hook 46 is provided at the edge of the wall 40 opposite the hinge 48 which hook 46 latches onto an eye 50 mounted to adjacent wall 44. The indicia used in conjunction with this organizer is a plurality of blocks 52 as shown in FIG. 4. These blocks 52 include cubes 54 representing single units and rectangular prisms 56 representing multiple units.

What is claimed is:

1. A teaching aide comprising a plurality of indicia bearing means of unit size and at least one indicia bearing means which is a multiple of unit size together with an organizer having means for allowing, either physically or by representation, the placing of the indicia bearing means in the organizer in a prescribed manner so as to form a distinct set of patterns, each pattern representing a specific digit or number and wherein said organizer means comprises a unit indicia bearing means size entrance into the organizer and opposite thereto an entrance for indicia bearing means of multiple unit width.

2. The teaching aide recited in claim 1, wherein the organizer is in the form of a two dimensional drawing.

3. The teaching aide recited in claim 1, wherein the organizer is a three dimensional receptacle for three dimensional indicia.

4. The teaching aide recited in claim 1, wherein the body of the organizer is divided into rows and columns.

5. The teaching aide recited in claim 4, wherein there are equal numbers of rows and columns.

6. The teaching aide recited in claim 1, wherein the body of the organizer is a square of a size able to accept four, nine or sixteen unit indicia bearing means therein.

7. The teaching aide recited in claim 6, wherein the organizer is a square able to accept two unit indicia bearing means in each row or column thereof.

8. The teaching aide recited in claim 6, wherein the organizer is a square able to accept three unit indicia bearing means in each row and column.

9. The teaching aide recited in claim 1, wherein the organizer is a wagon having an opening essentially equal to the size of a unit indicia bearing means on one side thereof and wherein the entire opposite side can be opened the width of a row of the organizer to accept a multiple size indicia bearing means and wherein the indicia bearing means are square and rectangular blocks.

10. The teaching aide recited in claim 1, wherein the indicia bearing means have designs thereon and wherein the number of designs on each indicia bearing means are equal to the ratio of the width of the indicia bearing means with respect to the width of a unit indicia bearing means.

11. A teaching aide comprising a plurality of indicia bearing means of unit size and at least one indicia bearing means which is a multiple of unit size, an organizer including a unit indicia bearing means entrance and opposite thereto an entrance for multiple unit width indicia bearing means wherein the organizer is a drawing of a house having a chimney leading to the main body of the house from the top thereof, said chimney essentially being equal in width to the width of the unit indicia bearing means and steps leading to the bottom of the house at least equal in width to the main body of the house which width is essentially a multiple of the unit width.

12. A method of teaching young children arithmetic by employing indicia bearing means of unit size and indicia bearing means of a width which is a multiple of unit size and an organizer into which the indicia bearing means are placed so as to form a prescribed pattern of indicia comprising the steps of (1) placing one or more indicia bearing means of unit size in the organizer from one side thereof through a space adapted to receive only unit size indicia bearing means to the lowest available row of the organizer, and placing multiple size indicia bearing means, where desired, corresponding to a multiple of the unit size in the organizer through a space adapted to receive multiple size indicia bearing means which is opposite the side of the organizer having the unit size space, the multiple size indicia being equal to the width of a row of indicia in the organizer so as to form a distinct pattern recognizable by the child.

* * * * *